(12) United States Patent
Liljedahl et al.

(10) Patent No.: US 6,202,574 B1
(45) Date of Patent: Mar. 20, 2001

(54) COMBUSTION METHOD AND APPARATUS FOR PRODUCING A CARBON DIOXIDE END PRODUCT

(75) Inventors: Gregory N. Liljedahl, Tariffville; Mark Palkes, Glastonbury, both of CT (US)

(73) Assignee: ABB Alstom Power Inc., Windsor, CT (US)

( * ) Notice: Subject to any disclaimer, the term of this patent is extended or adjusted under 35 U.S.C. 154(b) by 0 days.

(21) Appl. No.: 09/351,059

(22) Filed: Jul. 9, 1999

(51) Int. Cl.[7] ............... F23J 15/00; F25J 1/00; F23B 7/00; F23K 1/00
(52) U.S. Cl. ............ 110/233; 110/215; 110/232; 110/203; 110/204
(58) Field of Search ............... 110/215, 344, 110/345, 348, 233, 232, 203, 204; 62/602; 423/437 R, 437.1

(56) References Cited

U.S. PATENT DOCUMENTS

| | | | |
|---|---|---|---|
| 3,996,862 | * 12/1976 | Besik et al. | 110/10 |
| 4,246,853 | * 1/1981 | Mehta | 110/347 |
| 4,493,269 | * 1/1985 | Musto et al. | 110/106 |
| 4,498,289 | * 2/1985 | Osgerby | 60/39.52 |
| 4,762,074 | * 8/1988 | Sorensen | 110/346 |
| 5,309,850 | * 5/1994 | Downs et al. | 110/235 |
| 5,402,739 | * 4/1995 | Abboud et al. | 110/346 |
| 5,405,595 | * 4/1995 | Tomikawa et al. | 423/659 |
| 5,488,916 | * 2/1996 | Bozzuto | 110/347 |
| 5,538,539 | * 7/1996 | Spokoyny et al. | 96/52 |
| 5,673,634 | * 10/1997 | Karger et al. | 110/234 |
| 5,906,806 | * 5/1999 | Clark | 423/437.1 |

OTHER PUBLICATIONS

Olsen, Unit Processes and Principles of Chemical Engineering, 1–3, Jul. 5, 1932.*

\* cited by examiner

Primary Examiner—Denise L. Ferensic
Assistant Examiner—Ken B. Rinehart
(74) Attorney, Agent, or Firm—Russell W. Warnock

(57) ABSTRACT

A fossil fuel fired combustion apparatus and a method for operating the fossil fuel fired combustion apparatus are provided which offer the flexibility to use carbon dioxide ($CO_2$) both as a desirable end product and as support to the combustion process. The method includes the step of introducing a substantially pure oxygen feed stream into the fossil fuel fired combustion apparatus and the step of combusting a fossil fuel in the presence of the substantially pure oxygen feed stream to produce a flue gas having carbon dioxide and water vapor as its two largest constituent elements by volume. The method also includes the step of passing the flue gas through an oxygen feed stream preheater at which heat from the flue gas is transferred to the oxygen feed stream. Furthermore, the method includes the step of separating the flue gas into an end product portion and a recycling portion. The method additionally includes cooling and compressing the end product portion of the flue gas so as to yield carbon dioxide in a liquid phase and directing the recycling portion of the flue gas to the fossil fuel fired combustion unit to contribute to the combustion process therein.

3 Claims, 2 Drawing Sheets

COMBUSTION METHOD AND APPARATUS FOR PRODUCING A CARBON DIOXIDE END PRODUCT

BACKGROUND OF THE INVENTION

The present invention relates to a fossil fuel fired combustion apparatus and a method for operating the combustion apparatus for producing a carbon dioxide end product.

U.S. Pat. No. 5,175,995 to Pak et al describes a conventional power generation plant operable to burn fuel with air in a combustor so as to thereby provide combustion gas energy to drive a steam or gas turbine. In those versions of such conventional power generation plants which combust natural gas, petroleum fuel gas or coal gas as the fuel for the combustion process, this fuel includes carbon components such as carbon (C), carbon monoxide (CO), and other hydrocarbons ($C_mH_n$). Accordingly, the flue gas produced by a combustion process which combusts the fuel in the presence of air is comprised of carbon dioxide ($CO_2$), nitrogen oxide ($NO_x$), and sulphur oxide ($SO_x$) as well as nitrogen gas ($N_2$).

The '995 Pak et al patent further notes that the release of gases such as $NO_x$, $SO_x$, and $CO_2$ into the atmosphere creates environmental pollution. Conventional power generation plants have conventionally countered such pollution by the deployment of removal equipment such as scrubbers to remove the $NO_x$ and $SO_x$ pollutants. Moreover, removal equipment has been deployed to remove the carbon dioxide ($CO_2$) present in the flue gas including removal equipment of the type which utilizes a sorbent to selectively absorb the carbon dioxide ($CO_2$) from the flue gas. However, this solvent approach, according to the '995 Pak et al patent, disadvantageously requires additional heat energy to heat the solvent and it is not practical to provide the relatively long contact time between the solvent and the carbon dioxide ($CO_2$) for the solvent to fully absorb the carbon dioxide ($CO_2$).

The '995 Pak et al patent discloses several versions of a closed combined cycle type power generation plant which purports to ameliorate some of the disadvantages of the carbon dioxide ($CO_2$) absorbing solvent approach. In each version of the power generation plant disclosed in this reference, fuel is supplied to a combustor in the presence of oxygen instead of in the presence of air so as to produce a combustion gas (flue gas) which mainly includes a water component and carbon dioxide ($CO_2$). This combustion gas is handled so as to separate the water component and the carbon dioxide ($CO_2$) with the separated carbon dioxide ($CO_2$) being recycled as the working fluid for driving a turbine of the combined cycle power generation plant. Since the combustion of the fuel in presence of oxygen instead of air substantially eliminates the creation of $NO_x$ and, further, since the carbon dioxide ($CO_2$) is retained within the closed cycle as a working fluid, the approach disclosed by the '995 Pak et al patent advantageously avoids the discharge of $NO_x$ as well as carbon dioxide ($CO_2$).

U.S. Pat. No. 4,498,289 to Osgersby also discloses a power system which combusts a hydrocarbonic fuel in the presence of oxygen in lieu of air so as to obtain a working fluid comprised of carbon dioxide ($CO_2$). While the '995 Pak et al patent and the '289 Osgersby patent each disclose an arrangement for reducing carbon dioxide ($CO_2$) emissions via the combustion of fuel in the presence of oxygen instead of air, the art could still benefit from an arrangement for new or existing power generation system designs which offers the flexibility to both to produce carbon dioxide ($CO_2$) as a desirable end product and to use carbon dioxide ($CO_2$) as support to the combustion process.

SUMMARY OF THE INVENTION

It is an object of the present invention to provide an arrangement for new or existing power generation system designs which offers the flexibility both to produce carbon dioxide ($CO_2$) as a desirable end product and as support to the combustion process.

It is another object of the present invention to provide an arrangement for producing liquid carbon dioxide ($CO_2$) which improves the heat output of a fossil fuel fired power generating system.

According to one aspect of the present invention, a method for operating a fossil fuel fired combustion unit is provided for new or existing power generation system designs which offers the flexibility to use carbon dioxide ($CO_2$) both as a desirable end product and as support to the combustion process. The method includes the step of introducing a substantially pure oxygen feed stream into the fossil fuel fired combustion unit and the step of combusting a fossil fuel in the presence of the substantially pure oxygen feed stream to produce a flue gas having carbon dioxide and water vapor as its two largest constituent elements by volume.

The method of the one aspect of the present invention also includes the step of passing the flue gas through an oxygen feed stream pre-heater at which heat from the flue gas is transferred to the oxygen feed stream. Furthermore, the method includes the step of separating the flue gas into an end product portion and a recycling portion. The method additionally includes cooling and compressing the end product portion of the flue gas so as to yield carbon dioxide in a liquid phase and directing the recycling portion of the flue gas to the fossil fuel fired combustion unit to contribute to the combustion process therein.

The method of the one aspect of the present invention preferably includes the additional step of routing the flue gas through an air pre heater before the step of passing the flue gas through the oxygen feed stream pre heater to thereby raise the temperature of the flue gas. Also, in accordance with another preferred feature of the method, the step of directing a recycling portion of the flue gas to the fossil fuel fired combustion unit includes diverting at least part of the recycling portion of the flue gas through the air pre heater to effect a transfer of heat from the recycling portion of the flue gas to the flue gas routed through the air pre heater.

According to another aspect of the present invention, a fossil fuel fired combustion unit is provided for new or existing power generation system designs which offers the flexibility to use carbon dioxide ($CO_2$) both as a desirable end product and as support to the combustion process. The combustion unit includes means for introducing a substantially pure oxygen feed stream into the fossil fuel fired combustion unit and means for combusting a fossil fuel in the presence of the substantially pure oxygen feed stream to produce a flue gas having carbon dioxide and water vapor as its two largest constituent elements by volume.

The fossil fuel fired combustion unit of the another aspect of the present invention also includes means for passing the flue gas through an oxygen feed stream pre-heater at which heat from the flue gas is transferred to the oxygen feed stream. Additionally, the combustion unit includes means for separating the flue gas into an end product portion and a recycling portion. The combustion unit further includes means for cooling and compressing the end product portion of the flue gas so as to yield carbon dioxide in a liquid phase and means for directing the recycling portion of the flue gas to the fossil fuel fired combustion unit to contribute to the combustion process therein

DETAILED DESCRIPTION OF THE PREFERRED EMBODIMENT

Figure 1:
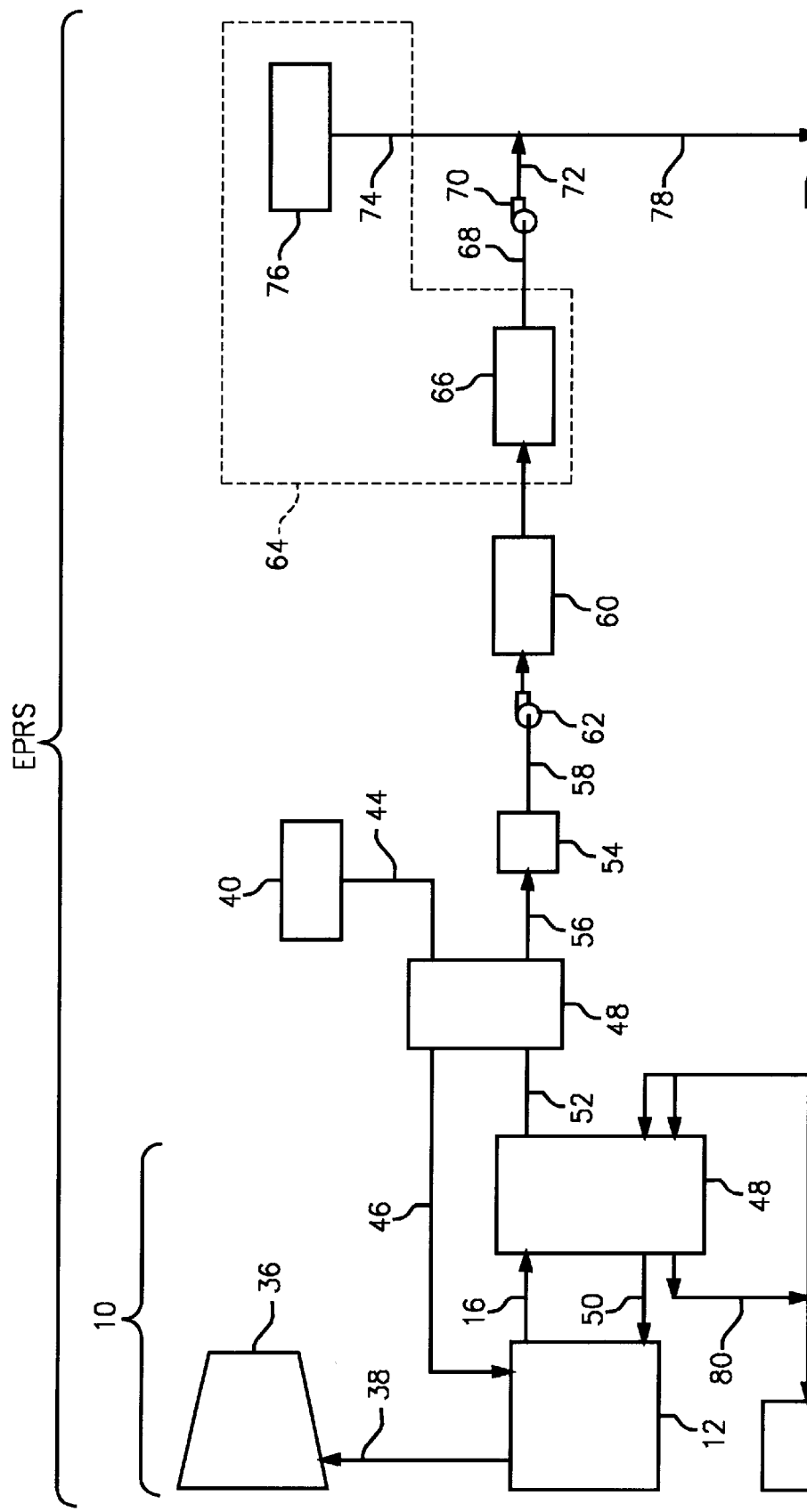
FIG. 1 is a schematic view of a carbon dioxide end product and recyclable system which is operable in accordance with the method of the present invention to produce a carbon dioxide end product.

FIG. 1 is a schematic view of an exemplary combustion apparatus operable to both generate electrical power and produce a carbon dioxide ($CO_2$) end product in accordance with the method of the present invention. Details of the arrangement—hereinafter generally designated as the end product and recyclable system EPRS—will now be provided commencing with a description of the details concerning a combined cycle power generating unit 10 of the end product and recyclable system EPRS. Attention is now drawn to FIG. 2 which illustrates the exemplary combined cycle power generating unit 10 having a fossil fuel fired combustion vessel in the form of a furnace 12 and additionally including a horizontal gas pass 14 and a back pass 16. The furnace 12 has an fireside defined by a plurality of water wall tubes 18 in which a heat exchange medium—namely, water—is circulated and is converted into steam as a result of heating of the tubes 18 during the combustion of a fossil fuel such as, for example, coal, in the furnace 12. The horizontal gas pass 14 and the back pass 16 may comprise selected arrangements of economizers, superheaters, and reheaters.

A coal feed apparatus 20 is operable to feed coal to a feeder 22 which controls the rate of coal flow to a pulverizer 24. A hot combustion gas is also fed to the pulverizer 24 via a duct 28 and this combustion gas carries pulverized coal through and out of the pulverizer 24 and thereafter through coal pipes 26 to a firing system which includes a plurality of tangential firing windboxes 30. The combustion gas, as will be described in more detail shortly, is variously comprised of different constituent elements depending upon the particular location at which the combustion gas is introduced—i.e., the combustion gas is composed of one group of constituent elements when its introduction location is at the pulverizer 24 and is composed of another group of constituent elements when its introduction location is at the furnace 12. The firing system also includes several groups of coal nozzles 32, each group of coal nozzles 32 being mounted in a respective tangential firing windbox 30 which each also support a group of secondary combustion gas nozzles 34. The windboxes 30 introduce controlled flows of combustion gas and pulverized coal into the fireside of the furnace 12 to effect the formation therein of a rotating fireball. By way of exemplification and not limitation, the nature of the construction of the firing system of the furnace 12 may take the form of that which comprises the subject matter of U.S. Pat. No. 5,020,454.

Figure 2:
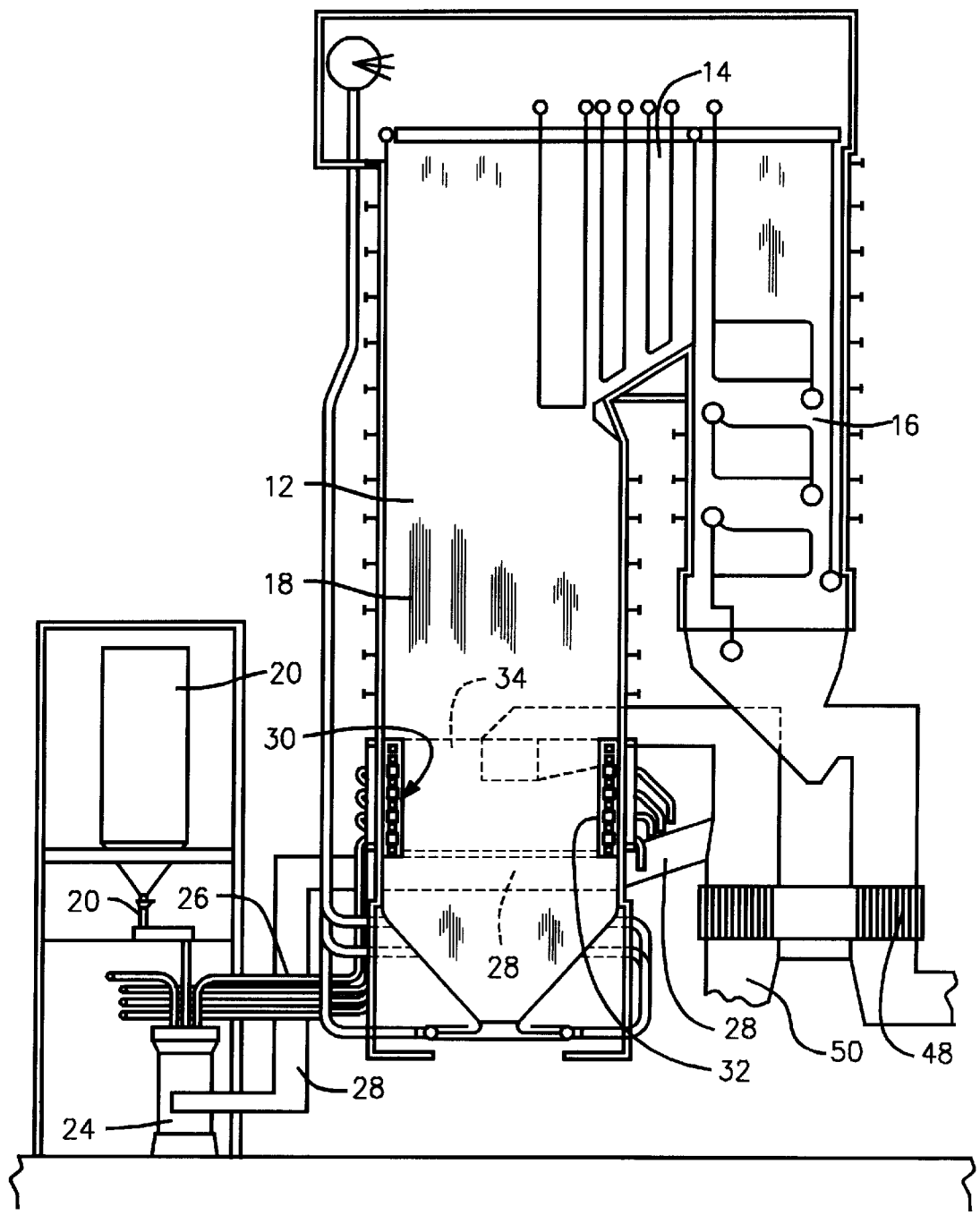
FIG. 2 is an enlarged front elevational view of a portion of the carbon dioxide end product and recyclable system shown in FIG. 1 and showing the combustion apparatus of the system.

Continuing with the description of the fossil fuel-fired steam generator 12, which is illustrated in FIG. 2 of the drawings, it is within the fireside of the fossil fuel-fired steam generator 12 that the combustion of the fossil fuel and combustion gas, which is injected thereinto, is initiated. The flue gas that is produced from this combustion of the fossil fuel and combustion gas rises upwardly in the fossil fuel-fired steam generator 12. During the upwardly movement thereof in the fossil fuel-fired steam generator 12, the flue gas in a manner gives up heat to the fluid flowing through the tubes 18 that line all four of the walls of the fossil fuel-fired steam generator 12. Then, the flue gas flows through the horizontal gas pass 14 to the back pass 16. During the passage thereof through the horizontal gas pass 14 and the back pass 16 of the fossil fuel-fired steam generator 12, the flue gas gives up heat to the fluid flowing through the superheater and economizer heat transfer surfaces which are supported in the horizontal gas pass 14 and the back pass 16.

The combined cycle power generating unit 10 also includes a turbine 36 for generating electricity under the motive action of steam passed thereover. Steam is conducted from the furnace 12 to the turbine 36 via a plurality of ducts 38 and injected thereagainst to drive the turbine.

With reference again to FIG. 1, the end product and recyclable system EPRS also includes an oxygen source 40 for supplying the particular variety of combustion gas which is introduced into the furnace 12 via the secondary combustion gas nozzles 34. The oxygen ($O_2$) supplied by the oxygen source 40 is preferably created by an air separation process which separates oxygen ($O_2$) from an ambient air feed stream and, in this regard, the oxygen source 40 can be configured, for example, as a cryogenic plant having the capability of producing oxygen ($O_2$) of a purity of at least ninety-five percent (95%). The oxygen ($O_2$) is pre heated by a pure oxygen pre heater 42 having a cold side inlet communicated with an exit duct 44 of the oxygen source 40 and a cold side outlet communicated with a duct 46 which, in turn, is connected via a duct manifold arrangement with the secondary combustion gas nozzles 34. The hot side of the pure oxygen pre heater 42 is supplied with flue gas which has flowed through the back pass 16 and thereafter through the hot side of a rotary regenerative pre heater 48 for limited transfer of heat from the flue gas to recycled flue gas being returned to the furnace 12.

The recycled flue gas is conducted via a recycle duct 50 from the rotary regenerative pre heater 48 to the furnace 12, as seen in FIGS. 1 and 2. On the other hand, the flue gas which had been supplied to the hot side of the rotary regenerative pre heater 48 from the back pass 16 now exits the hot side outlet of the rotary regenerative pre heater 48 with a relatively reduced heat content and flows through a duct 52 communicated with the hot side inlet of the pure oxygen pre heater 42. The flue gas then gives up further heat to the oxygen ($O_2$) flowing through the pure oxygen pre heater 42 enroute to the furnace 12.

The two largest constituent elements by volume of the flue gas exiting the back pass 16 are carbon dioxide ($CO_2$) and water vapor ($H_2O$). This composition of the flue gas results from the combustion of the coal within the furnace 12 in the presence of the pure or nearly pure oxygen supplied from the oxygen source 40 and in the presence of recycled flue gas which is fed to the pulverizer 24 and to the secondary combustion gas nozzles 34. The recycled flue gas is composed of carbon dioxide ($CO_2$) and water vapor ($H_2O$) although the proportion of carbon dioxide ($CO_2$) to water vapor ($H_2O$) is greater than in the flue gas exiting the back pass 16 due to a water condensation treatment of the flue gas prior to recycling of the flue gas, as will be described in more detail shortly.

The end product and recyclable system EPRS additionally includes, as seen in FIG. 1, an electrostatic precipitator 54 operable to remove, in conventional manner, selected solids entrained with the flue gas. The electrostatic precipitator 54 is communicated with the pure oxygen pre heater 42 via a duct 56 for receiving the flue gas following its passage through the pure oxygen pre heater 42. The flue gas exiting the electrostatic precipitator 54 next flows via a duct 58 to an apparatus to recover sensible heat available in the flue gas which is preferably a parallel low pressure feedwater heater, generally designated in FIG. 1 as the feedwater heater 60. If desired or as needed, the circulation of the flue gas can be aided by the operation of conventional fans at selected locations along the flue gas flow path. For example, an induced draft fan 62 is representatively shown in FIG. 1 as located relative to the flow of the flue gas through the duct 58 so as to aid movement of the flue gas upstream of that location. The feedwater heater 60 recovers sensible heat of the flue gas by heating feedwater of relatively lower temperature prior to the supply of the feedwater into the furnace 12.

The flue gas exiting the feedwater heater 60 still remains relatively rich in carbon dioxide ($CO_2$). The end product and recyclable system EPRS thus includes a liquid recovery assembly 64 which is operable to liquefy a portion of the carbon dioxide ($CO_2$) of the flue gas so as to render a liquid carbon dioxide product suitable for a commercial operation such as, for example, enhanced oil recovery (EOR). The liquid recovery assembly 64 includes a gas cooler 66 communicated with the feedwater heater 60 which is operable to remove a substantial portion of the water vapor of the flue gas exiting the feedwater heater 60 by contacting the flue gas with relatively colder water in countercurrent fashion. This contact causes a relatively significant proportion of the water vapor in the flue gas to condense into water and the water is then separated from the flue gas.

The flue gas exiting the gas cooler 66 is flowed through a duct 68, with the assistance of a booster fan 70, to a junction 72 at which one selected portion of the flue gas is diverted from the remaining portion of the flue gas to flow along a duct 74 to a further treatment sub assembly 76 of the liquid recovery assembly 64 at which the diverted flue gas portion is subjected to further treatment ultimately culminating in liquefaction of the carbon dioxide ($CO_2$) comprised in the diverted flue gas portion. The further treatment sub assembly 76 includes a compressor for compressing the diverted flue gas portion at a pressure sufficient to liquefy the carbon dioxide ($CO_2$) therein and a carbon dioxide stripper which reduces the $N_2/O_2$ content of the resulting liquid carbon dioxide ($CO_2$).

The remaining portion of the flue gas which is not diverted at the junction 72 to the further treatment sub assembly 76 is flowed through a duct 78 along a recycle path to ultimately be recycled into the furnace 12. The determination of the proportion of the flue gas to divert for liquefaction of the carbon dioxide ($CO_2$), on the one hand, and for recycling to the furnace 12, on the other hand, is preferably guided by a consideration of the role of the recycled flue gas in maintaining the thermal balance between the heat transferred in the furnace 12 and the convective heat transfer surfaces such that detrimentally high temperatures and heat fluxes are avoided. The non-diverted remaining portion of the flue gas is flowed through the cold side of the rotary regenerative pre heater 48 for increasing the temperature of this recycled flue gas. A sub portion of this recycled flue gas is diverted after passage through the rotary regenerative pre heater 48 into the recycle duct 50 for subsequent introduction into the furnace 12 via the secondary combustion gas nozzles 34 while another sub portion of the recycled flue gas is diverted into a duct 80 for passage therethrough to the pulverizer 24.

The end product and recyclable system EPRS thus provides a system which can be operated in accordance with the method of the present invention to produce a liquid carbon dioxide ($CO_2$) end product and a recyclable flue gas for supporting the combustion process. An exemplary implementation of the method of the present invention will now be described in connection with the end product and recyclable system EPRS which has been described with respect to FIGS. 1 and 2. The method includes the step of introducing a substantially pure oxygen feed stream into a steam generating unit. This step is implemented by the supply of pure or nearly pure (preferably greater than 95% pure) oxygen from the oxygen source 40 to the furnace 12. A next step of the method includes combusting a fossil fuel in the presence of the substantially pure oxygen feed stream to produce a flue gas having carbon dioxide and water vapor as its two largest constituent elements by volume and this step is implemented by the combustion of the coal, supplied from the pulverizer 24, in the furnace 12 in the presence of both the supplied oxygen from the oxygen source 40 and the recycled flue gas which has been pre heated in the rotary regenerative pre heater 48. Thereafter, the next implemented method step includes passing the flue gas through an oxygen feed stream pre-heater at which heat from the flue gas is transferred to the oxygen feed stream. This step of the method is implemented by the end product and recyclable system EPRS shown in FIGS. 1 and 2 by the operation of the pure oxygen pre heater 42 to effect the transfer of heat from the flue gas which has just exited the back pass 16 to the oxygen being supplied to the furnace 12.

The method then calls for the steps of separating the flue gas into an end product portion and a recycling portion, cooling and compressing the end product portion of the flue gas so as to yield carbon dioxide in a liquid phase, and directing the recycling portion of the flue gas to the steam generating unit to contribute to the combustion process therein. These steps are accomplished by the treatment regime of the liquid recovery assembly 64, which renders liquid carbon dioxide ($CO_2$) from the diverted flue gas portion, and the flue gas path portion extending from the junction 72 to the furnace 12 and the pulverizer 24, which recycles the non-diverted remaining portion of the flue gas.

While an embodiment and variations of the present invention have been shown, it will be appreciated that modifications thereof, some of which have been alluded to hereinabove, may still be readily made thereto by those skilled in the art. It is, therefore, intended that the appended claims shall cover the modifications alluded to herein as well as all the other modifications which fall within the true spirit and scope of the present invention.

What is claimed is:

1. A fossil fuel fired combustion unit, comprising:
   means for introducing a substantially pure oxygen feed stream into the fossil fuel fired combustion unit;
   means for combusting a fossil fuel in the presence of the substantially pure oxygen feed stream to produce a flue gas having carbon dioxide and water vapor as its two largest constituent elements by volume;
   means for pulverizing a fossil fuel, the means for pulverizing a fossil fuel being communicated with the means for combusting a fossil fuel for feeding pulverized fossil fuel thereto;
   an air pre heater;
   means for routing the flue gas through the air pre heater;
   means for passing the flue gas, downstream of the passage of the flue gas through the air pre heater, through an oxygen feed stream pre heater at which heat from the flue gas is transferred to the oxygen feed stream;

means for separating the flue gas into an end product portion and a recycling portion;

means for cooling and compressing the end product portion of the flue gas so as to yield carbon dioxide;

means for directing the recycling portion of the flue gas through the air pre heater for the transfer of heat to the recycling portion of the flue gas; and means for flowing the recycling portion of the flue gas to the means for pulverizing a fossil fuel after passage of the recycling portion of the flue gas through the air preheater for subsequent flow of the recycling portion of the flue gas with the pulverized fossil fuel to the fossil fuel fired combustion unit to contribute to the combustion process therein.

2. A fossil fuel fired combustion unit according to claim 1 and further including means for routing some of the recycling portion of the flue gas to combustion gas nozzles which are operable to effect delivery of combustion gas into the fossil fuel fired combustion unit.

3. A fossil fuel fired combustion unit according to claim 2 wherein the means for cooling and compressing the end product portion of the flue gas so as to yield carbon dioxide includes means for producing carbon dioxide in a liquid phase.

* * * * *